United States Patent [19]

Voss

[11] 4,452,873

[45] Jun. 5, 1984

[54] POSITIVE ELECTRODE FOR GALVANIC HIGH-TEMPERATURE CELLS AND METHOD OF ITS MANUFACTURE

[75] Inventor: Heinz-Joachim Voss, Frankfurt, Fed. Rep. of Germany

[73] Assignee: Varta Batterie Aktiengesellschaft, Hanover, Fed. Rep. of Germany

[21] Appl. No.: 325,209

[22] Filed: Nov. 27, 1981

Related U.S. Application Data

[63] Continuation of Ser. No. 49,964, Jun. 19, 1979, abandoned.

[30] Foreign Application Priority Data

Jun. 20, 1978 [DE] Fed. Rep. of Germany ....... 2826955

[51] Int. Cl.$^3$ .............................................. H01M 4/02
[52] U.S. Cl. .................................... 429/209; 429/218; 429/220; 429/221; 429/223
[58] Field of Search ............... 429/220, 221, 223, 218, 429/103, 191, 112, 16, 45, 209; 252/182.1

[56] References Cited

U.S. PATENT DOCUMENTS

| | | | |
|---|---|---|---|
| 3,410,730 | 11/1968 | Rightmire et al. | 429/218 X |
| 3,941,612 | 3/1976 | Stunnenberg et al. | 429/103 |
| 4,143,217 | 3/1979 | Joo et al. | 429/218 |
| 4,164,069 | 8/1979 | Tomczuk | 429/103 X |

Primary Examiner—Anthony Skapars
Attorney, Agent, or Firm—Weiser, Stapler & Kimmelman

[57] ABSTRACT

A positive electrode for galvanic high-temperature cells with solid negative electrodes based upon Li, Mg, Ca or Al is produced by sintering a heavy metal sulfide (e.g. FeS, CnS), with a heavy metal powder (e.g. Fe, Ni). In the sinter electrode the heavy metal powder present in weight percentage of about 20% to 40% forms a rigid electrically conductive framework in which the active heavy metal sulfide is embedded. The free-pore volume of the electrode is about 50%.

4 Claims, No Drawings

POSITIVE ELECTRODE FOR GALVANIC HIGH-TEMPERATURE CELLS AND METHOD OF ITS MANUFACTURE

This is a continuation of application Ser. No. 49,964 filed June 19, 1979 now abandoned.

The invention relates to a positive electrode for galvanic high-temperature cells which have a solid negative electrode utilizing one of the metals Li, Mg, Ca and Al as the active material, and having an electrolyte of molten salts. A further subject of the invention is the manufacture of such an electrode.

Among the electrochemical current sources with above-average high energy content and elevated performance capability, the so-called high-temperature cells with molten liquid electrolyte currently command increasing interest. Unlike in the sodium/sulfur cell, which has been known for some time, and in which the electrode materials are liquid and react with each other via a solid, ceramic oxide "electrolyte", in the high-temperature systems of which we are speaking here the electrodes are solid. Nevertheless, even in these systems with molten liquid salt electrolytes, use can be made of the alkali metals with their relatively low melting points as energy rich electrode material, when these are either fixated at the anode space by a diaphragm or attached by alloy formation with, for example, aluminum or silicon. The latter is feasible with lithium. In addition, there may also be utilized, as the anode material for the above-mentioned high-temperature cells with solid electrolytes, the elements Ca, Mg and Al, both in the pure state and in alloy form.

The electrolytes are molten salts such as the LiCl/KCl system or the LiF/LiCl/Kcl system, usually in eutectic composition.

As the positive electrode materials there are used heavy metal sulfides, oxides, or other chalcogenides of heavy metals. A particularly interesting sulfur compound for positive electrodes is iron(II) sulfide FeS, for example in the known LiAl/FeS system.

The electrolyte of such a cell ordinarily consists of an LiCl.KCl mixture which, when having 58.8 Mol % LiCl and 41.2 Mol % KCl or rather 44.8% by weight LiCl and 55.2% by weight KCl, exhibits a eutectic point of 352° C.

For the storage of the positive active material, there are mainly used porous ceramic housings of aluminum oxide, zirconium oxide or titanium oxide. For current takeoff there may be utilized, for example, iron powder, iron filings, and powdered or foamed carbon mixed in with the sulfide. Also, admixtures of lithium carbide Li$_2$C$_2$ are suitable for this purpose as described in U.S. Pat. No. 4,011,373, because this additive forms carbon particles in the positive electrode during charging and thereby enhances the conductivity of the electrode.

It is also known from U.S. Pat. No. 4,011,374, that it is possible to make a paste from the active positive material, a heat hardenable carbon-containing substance, e.g. a phenol, epoxy or furfuryl resin, a pore former such as a bicarbonate, and a conductor, and that these can be heated at a sufficiently high temperature (up to about 200° C.). By so doing, and after the bicarbonate has volatilized, the active material is embedded in a porous synthetic plastic matrix. It is also possible to heat this paste to about 900° C., in order to carbonize the matrix, or to turn it into graphite at even higher temperature.

It is frequently sufficient to press a mixture of FeS, KCl and lamp-black into electrodes which, however, are not mechanically very stable and require an additional outer framework when used in cyclical operation.

However, all of these procedures result in either mechanically weak electrode structures or ones which are inconvenient because of a cumbersome electrical current takeoff arrangement. In addition it has been observed that the lithium sulfide which is formed during discharge according to

$$2LiAl_x + FeS \rightarrow Li_2S + Fe + 2XAl$$

deposits in the positive electrode and this manifests itself by pronounced changes in volume. This leads to short circuits and low mass utilization.

Accordingly, it is an object of the present invention to produce a positive electrode with better mechanical strength and dimensional stability and which furthermore satisfies all of the requirements for good electrical conductivity.

This and other objects which will appear are achieved in accordance with the invention by making the positive electrode as a sinter electrode composed of a heavy metal sulfide MeS and a heavy metal. As heavy metal sulfides there are particularly useful sulfides of iron, cobalt, nickel, copper, molybdenum or mixtures of these metal sulfides. As heavy metal, there are suitable iron, cobalt, nickel or copper.

The sinter electrode embodying the invention exhibits a solid electrically conductive framework in which the active heavy metal sulfide is embedded. It has a free pore volume of about 50%. This high volume fraction is filled with a correspondingly great electrolyte quantity, thereby causing good mass utilization.

The above-mentioned storage of Li$_2$S in the positive mass is without deleterious consequences in the electrode embodying the invention because mass swelling is prevented by the rigid sintered frame.

At the same time, due to the rigid frame the electrical contact with the mass is maintained fully so that from this viewpoint too a good mass utilization is achieved.

A further advantage of the electrode embodying the invention is that a current takeoff of expanded iron metal, iron netting or a perforated plate can be sintered into it, so that a massive iron plate which had heretofore been used for this purpose becomes unnecessary. This yields a significant weight saving for the cell as a whole.

The manufacture of a positive electrode embodying the invention is described using as an illustration a sintered FeS electrode:

- 20 to 40, preferbly about 25 parts by weight Fe powder
- 60 to 80, preferably about 75 parts by weight FeS powder
- and about 2 parts by weight methyl cellulose are mixed for fifteen minutes in a tumble mixer. The Fe powder and the FeS powder are of commercial grade.

The homogeneous mixture is then sprinkled into a sinter form in the middle of which the current takeoff is positioned if desired, and briefly smoothed out but not compressed.

The mass is then sintered together in a sinter oven at temperatures between 800° and 900° C. for fifteen minutes. In so doing, the methyl cellulose which functions as the pore former is completely decomposed. The sintering takes place either in a hydrogen current or in a mixture of hydrogen and nitrogen.

After cooling, the resulting electrodes, due to their high mechanical strength, may be further processed if desired, through sawing, grinding or the like.

It has been found that the addition in accordance with the invention of the pore forming methyl cellulose to the initial mixture is important, although because of the loose poring into the sinter form special care to maintain a sufficient porosity during sintering appears to be unnecessary. Nevertheless, the small additive quantity has the effect of producing in the finished sinter electrode the largest possible pore volume, while the structure of the sinter framework on the other hand does not fall below a density which would be harmful to its strength.

I claim:

1. In a positive electrode for use in galvanic high temperature cells having a solid negative electrode comprising a metal selected from the group consisting of Li, Mg, Ca, and Al as the active material thereof, and an electrolyte of molten salt, the improvement which comprises: said positive electrode comprising a particulate mixture of a heavy metal sulfide comprising a heavy metal selected from the group consisting of iron, cobalt, nickel, copper and molybdenum or a mixture thereof, and a heavy metal selected from the group consisting of iron, cobalt, nickel and copper, sintered to form a rigid framework in which the heavy metal sulfide is embedded and which prevents mass swelling by virtue of its rigidity, said heavy metal consituting from about 20 to about 40% by weight of the electrode.

2. The positive electrode of claim 1 wherein the heavy metal constitutes about 25% weight of the electrode.

3. The positive electrode of claim 1 wherein the heavy metal forms a rigid electrically conductive framework in which the heavy metal sulfide is embedded.

4. The positive electrode of claim 1 wherein the second-mentioned heavy metal is not a sulfide.

* * * * *